United States Patent [19]

Smith

[11] Patent Number: 4,531,773
[45] Date of Patent: Jul. 30, 1985

[54] VEHICLE TAILGATE EXTENSION ASSEMBLY

[76] Inventor: Gareth J. Smith, 15533 Tupper St., Sepulveda, Calif. 91343

[21] Appl. No.: 565,223

[22] Filed: Dec. 23, 1983

[51] Int. Cl.³ .............................................. B62D 33/08
[52] U.S. Cl. .................................. 296/26; 296/57 R; 296/37.6; 224/42.42
[58] Field of Search ...................... 296/27, 26, 50, 51, 296/57 R, 37.6; 224/42.42 R

[56] References Cited

U.S. PATENT DOCUMENTS

| | | | |
|---|---|---|---|
| 2,046,175 | 6/1936 | Lim | 296/26 |
| 2,284,419 | 5/1942 | Greig | 296/26 |
| 4,472,639 | 9/1984 | Bianchi | 296/26 |

*Primary Examiner*—Robert R. Song
*Attorney, Agent, or Firm*—John J. Posta, Jr.

[57] ABSTRACT

The assembly of the present invention comprises a foldable container slideably connected to a pair of slide guides adapted to be secured to opposite sides of a vehicle tailgate. The container in one operative position has an open top and front and closed bottom, rear and sides. The container comprises a bottom bed panel, a rear panel hinged thereto and moveable between a stacked position over the bed panel, a vertical operative position and a hangtail operative position hanging below and behind the bed panel. A pair of side panels are hinged to opposite sides of the rear panel and are moveable between a stored position overlying the rear panel and an operative position perpendicular thereto and forwardly thereof. Catches releasably latch the side panels to the rear panel and, in the operative position, to a vehicle frame, and similar catches releasably latch the bed panel and thus the container to the slide guides. The container may slide between a forward stored position and a rear operative position. Telescoping slide guides and/or bed and side panels may be provided to facilitate rearward extension of the container. The assembly is simple, inexpensive, easy to install, store and remove, and effectively increases the carrying capacity of an open bed truck, station wagon, etc.

12 Claims, 11 Drawing Figures

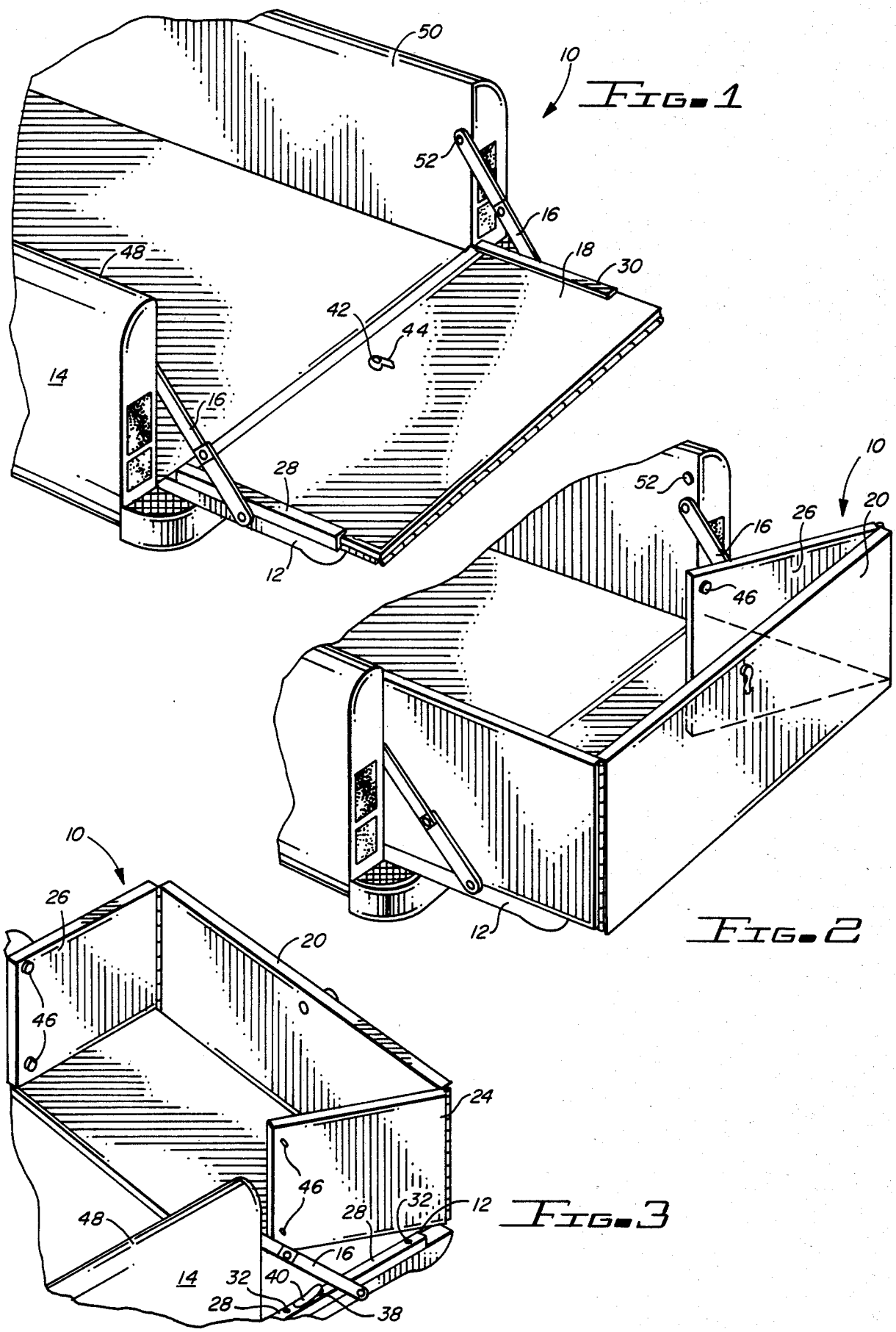

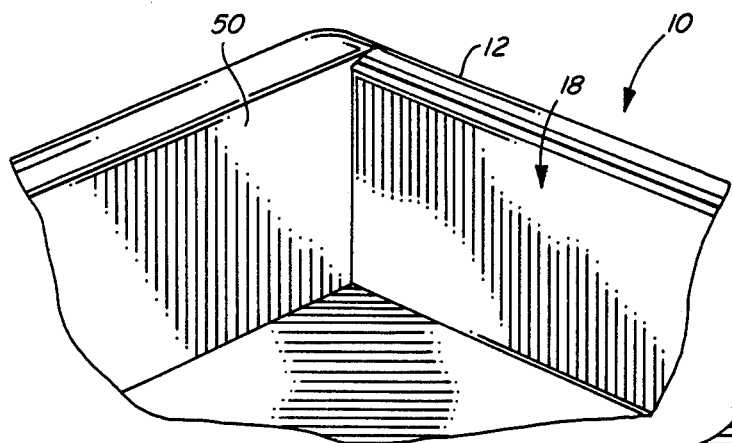
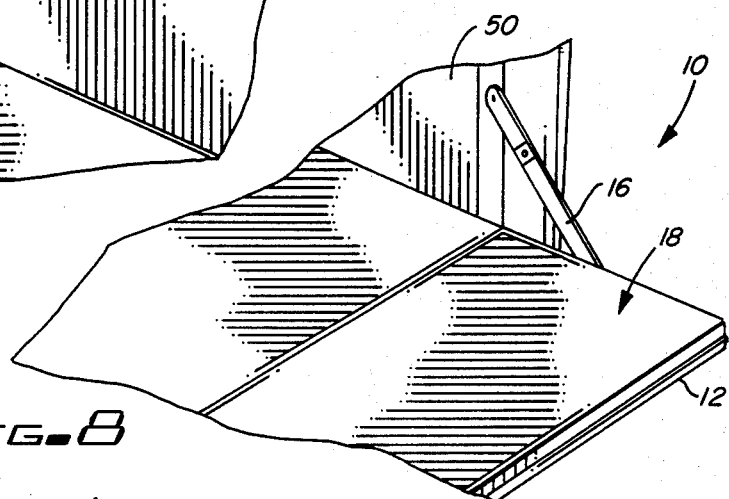
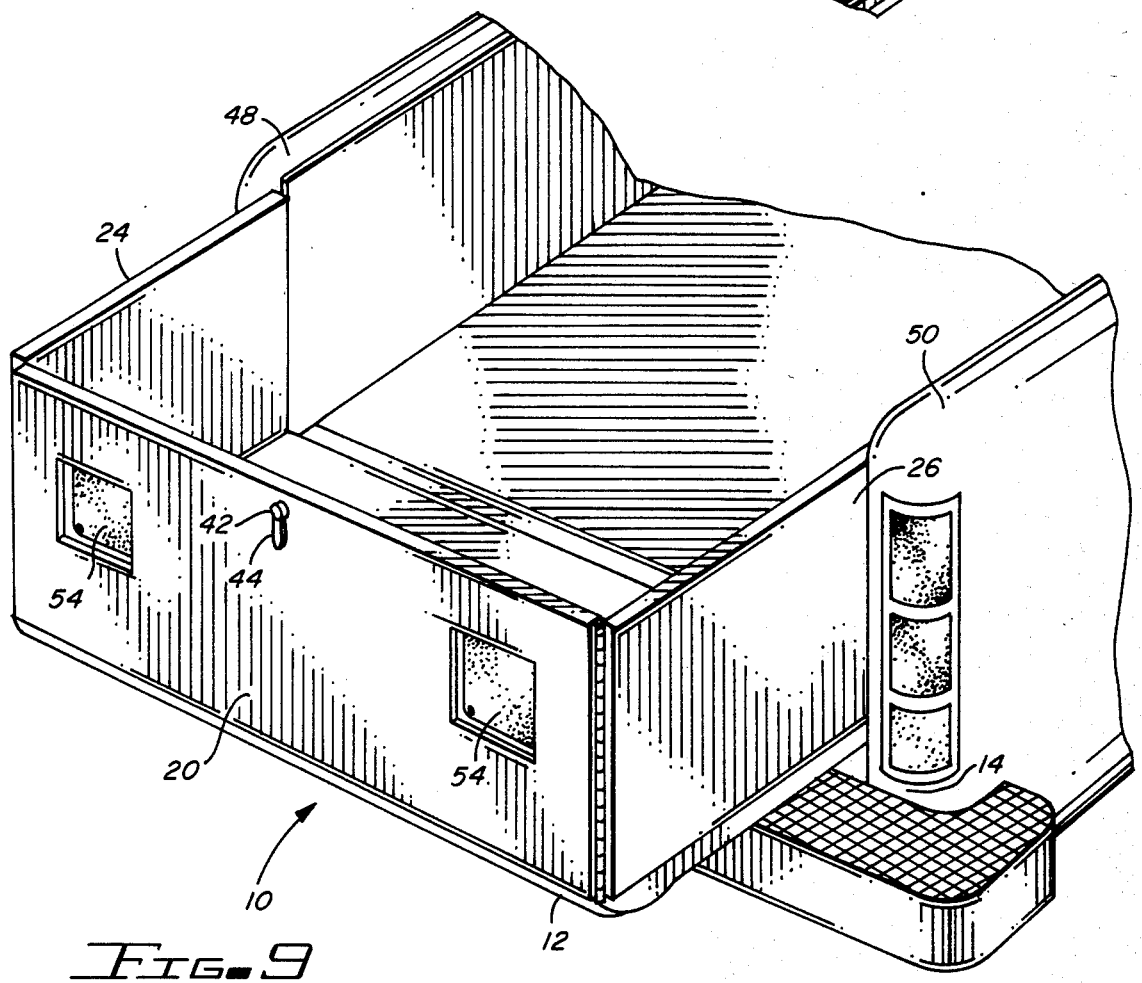

VEHICLE TAILGATE EXTENSION ASSEMBLY

BACKGROUND OF THE INVENTION

1. Field of the Invention

The present invention generally relates to carrying means and, more particularly, to a novel vehicle tailgate extension assembly.

2. Prior Art

In many instances vehicles such as station wagons and trucks having drop-down type tailgates are used to haul objects, such as pieces of lumber, panels, rugs, household items, furniture, etc., which extend out onto the tailgate and beyond. Such objects are a hazard for those driving behind such vehicles and may require attachment of signs, flags, etc., in order to avoid violation of the law. Moreover, such objects can easily roll off of the tailgate and be lost or cause accidents. In other instances added space is needed to haul goods not readily supportable on an open tailgate. There is at present no convenient device for providing increased temporary hauling space for such vehicles.

Accordingly, there is a need for such a device. The device should be simple, inexpensive, durable and effective to protect the material being hauled, temporarily increase the hauling space and be capable of being easily installed, stored and removed. It should not impede the normal operation of the tailgate and not materially decrease the main hauling area when not in use.

SUMMARY OF THE INVENTION

The improved vehicle tailgate extension assembly of the present invention satisfies all the foregoing needs. The assembly is substantially as set forth in the Abstract above. Thus, the assembly comprises a collapsable container formed of hingeably interconnected side, rear and bed panels. The container is slideably mounted on a pair of guides adapted to be connected to opposite sides of the inside of a vehicle tailgate. The container when in the hauling mode has an open top and front and closed bottom, rear and sides, thus enclosing a lowered vehicle tailgate to extend the vehicles' hauling space. When in the dumping mode, the rear panel of the container hangs down from the rear end of a tailgate below the bed panel of the container.

When in the stored mode, the rear panel with folded side panels rest against the bed panel, i.e., all panels are in stacked or sandwich relation and are adapted to rest (lock) against the inside of a raised vehicle tailgate. Thus, in the stored position, the assembly takes very little space. Appropriate catches and locks releasably hold the panels in their appropriate positions.

In one embodiment, the slide guides telescope and in another embodiment the bed and side panels telescope, in order to extend the container rearwardly of the tailgate and thus further increase the hauling space. Further features of the present invention are set forth in the following detailed description and accompanying drawings.

DRAWINGS

FIG. 1 is a schematic perspective view of a first preferred embodiment of the improved vehicle tailgate extension assembly of the present invention, shown mounted on a vehicle tailgate, with the tailgate in the down position and the container of the assembly slid rearwardly on its slide guides;

FIG. 2 is a schematic perspective view of the assembly of FIG. 1, shown with the side panels thereof being deployed into the operative position;

FIG. 3 is a schematic perspective view of the assembly of FIG. 1, again shown with the side panels being deployed into the operative position;

FIG. 7 is a fragmentary schematic perspective view of the assembly of FIG. 1 in the stored position against a tailgate;

FIG. 8 is a schematic fragmentary perspective view of the assembly of FIG. 1 with the panels thereof in the retracted position;

FIG. 9 is a schematic fragmentary perspective view of the assembly of FIG. 1 with the assembly in the operative hauling position and the rear panel thereof bearing safety reflector lights;

Figure 10:
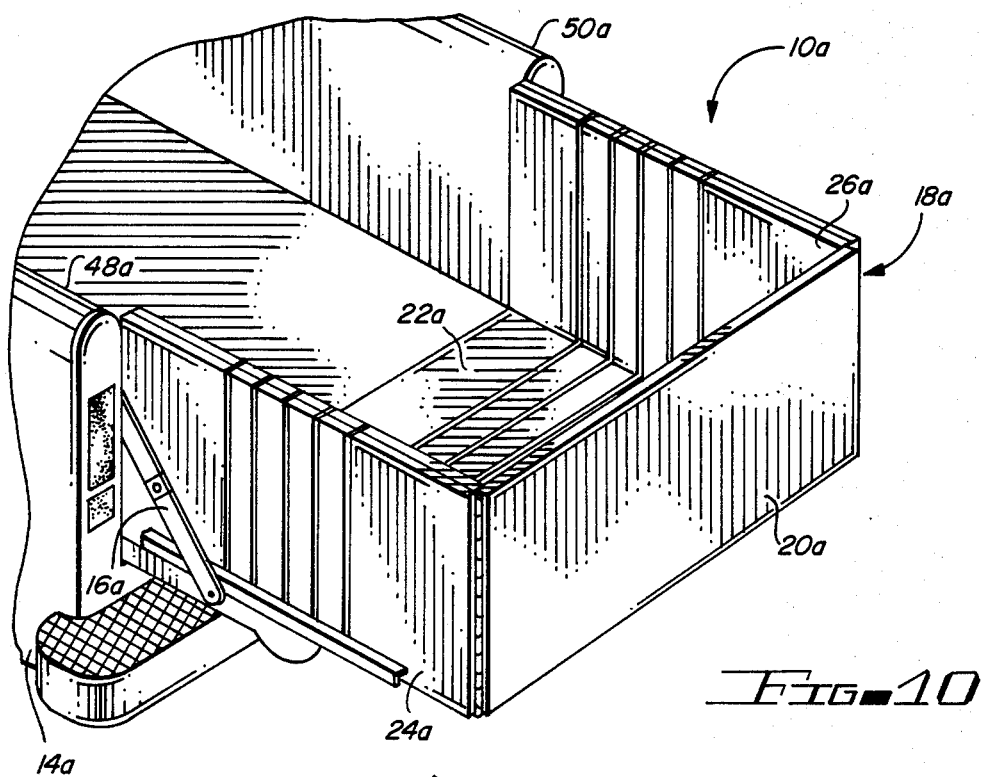
Figure 11:
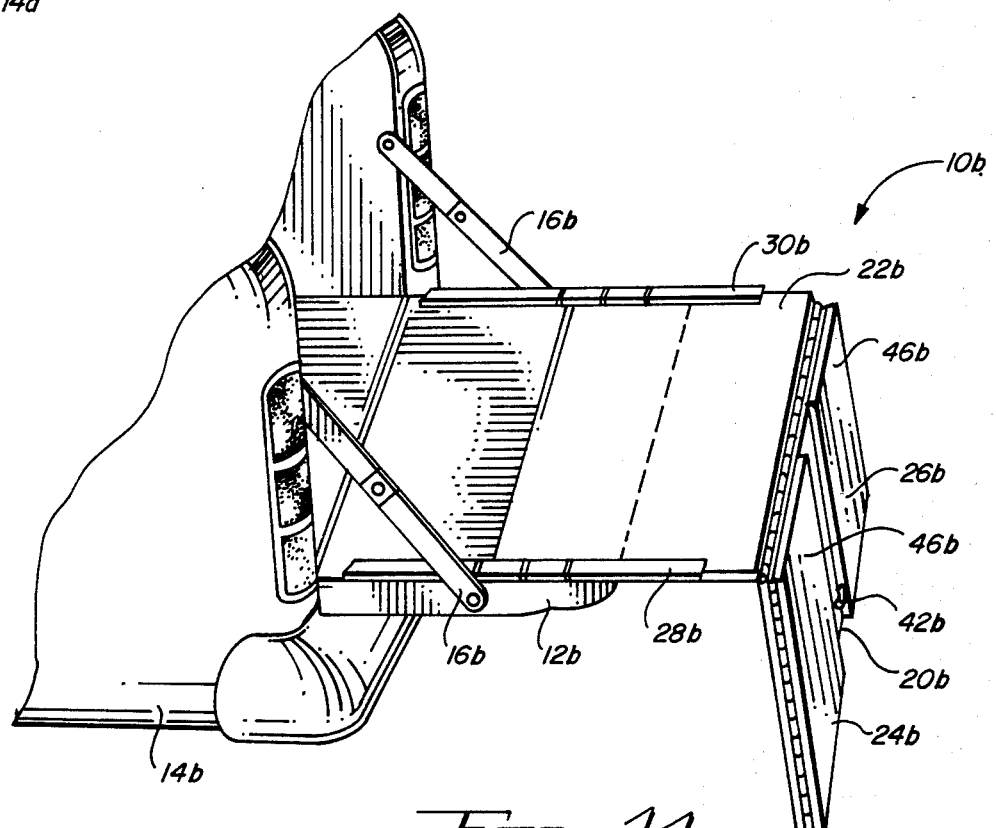

FIG. 10 is a schematic fragmentary perspective view, partly broken away, of a second preferred embodiment of the improved assembly of the present invention, with the side panels and bed panel thereof telescopable to extend the container thereof rearwardly; and, FIG. 11 is a schematic fragmentary perspective view, partly broken away, of a third preferred embodiment of the improved assembly of the present invention, with the slide guides thereof telescopable to extend the container thereof rearwardly.

DETAILED DESCRIPTION

FIGS. 1–9

Now referring more particularly to FIG. 1 of the accompanying drawings, a first preferred embodiment of the improved assembly of the present invention is shown installed on the tailgate of a vehicle. Thus, assembly 10 is shown installed on tailgate 12 of vehicle 14, which may be an open bed truck, station wagon, etc. Tailgate 12 is supported in the lowered horizontal position by strut braces 16.

Figure 4:
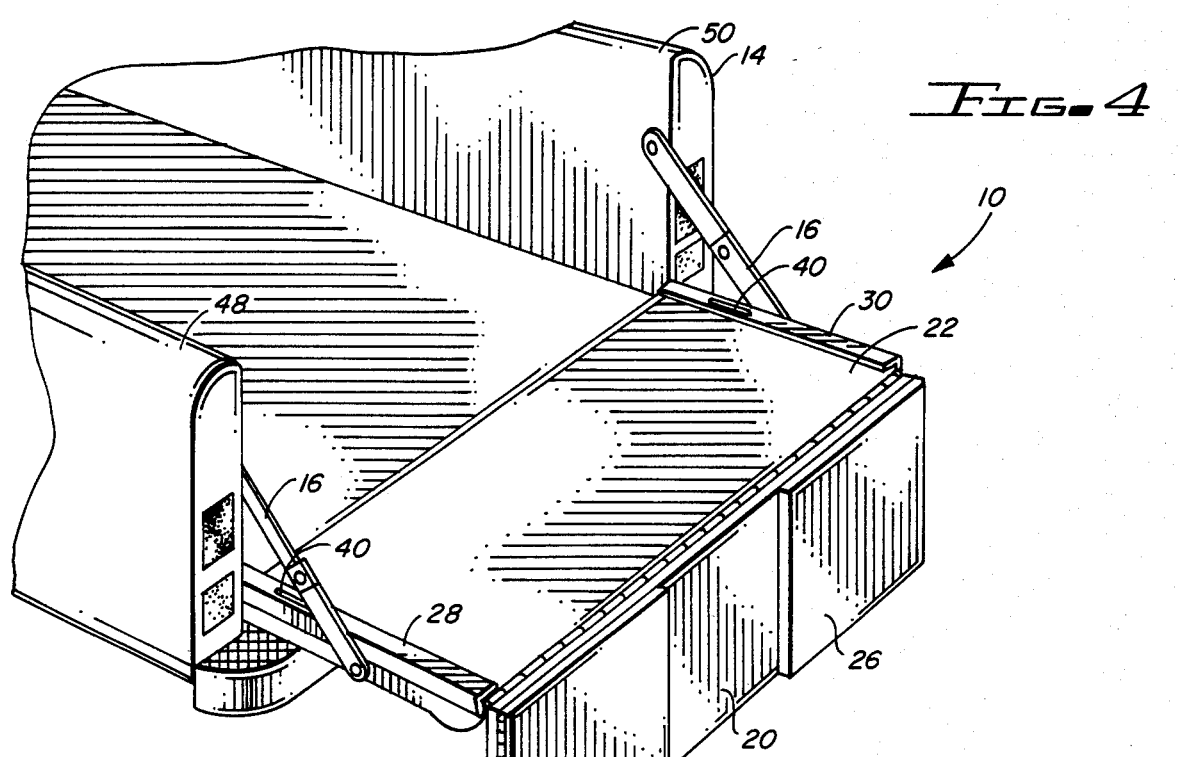
FIG. 4 is a schematic perspective view of the assembly of FIG. 1, with the rear panel in the dumping position.
Figure 5:
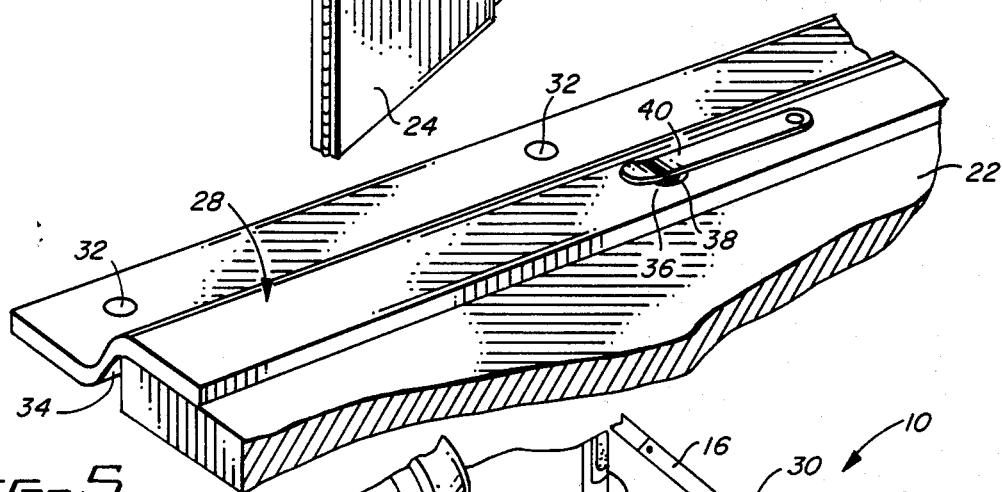
FIG. 5 is an enlarged schematic fragmentary view of the bed panel disposed in a slide guide.

Assembly 10 comprises, as shown more particuarly in FIGS. 2, 3 and 4, a container 18 having a rear panel 20 hinged to the rear end of a horizontal bed panel 22. Side panels 24 and 26 are hingedly connected to the opposite sides of rear panel 20. Bed panel 22 is slideably received in a pair slide guides 28 and 30 (FIG. 4) secured to the inner surface of tailgate 12, as by bolts 32 (FIGS. 3 and 5).

Each of slide guides 28 and 30 has a longitudinal recess 34 in which the side edge of bed panel 22 slides. Each of guides 28 and 30 also has an opening 36 down through which a ball or bullet 38 extends into recess 34, urged by spring 40. A similar opening (not shown) in the side edge of bed panel 12 in recess 34 is adapted to receive bullet 38, preventing rearward or forward movement of bed panel relative to guides 28 and 30. Thus, panel 22 can be slid rearwardly in recesses 34 to the operative position shown in FIGS. 1–4 and 6 from the stored position shown in FIG. 8 until releasably locked in place by bullet 38 and spring 40.

The deployment of bed panel 22 occurs after the stacked panels are unlocked from tailgate 12 by turning lock 42 connected through rear panel 20 to tailgate 12.

Thereupon rear panel 20 is raised to the vertical position, as by handle 44 of lock 42, and side panels 24 and 26, initially releasably secured thereto by spring-impelled bullet catches 46, are released and swung out until they are forwardly thereof and perpendicular thereto (FIGS. 2 and 3). They are then releasably locked in place against the sidewalls 48 and 50 of vehicle 14 by having catches 46 engage openings 52 in sidewalls 48 and 50.

In the fully deployed operative hauling position shown in FIG. 9, container 18 has an open front and top, and closed rear, bottom and sides, with side panels 24 and 26 secured to sidewalls 48 and 50, respectively, rear panel 20 vertical and bed panel 22 connected to tailgate 12 by guides 28 and 30. In this position, container 18 has extended the hauling capacity of vehicle 14 by enclosing tailgate 12. If desired, rear panel 20 can carry recessed safety reflector lights (panels) 54 or the like for improved driving protection (FIG. 9).

Figure 6:
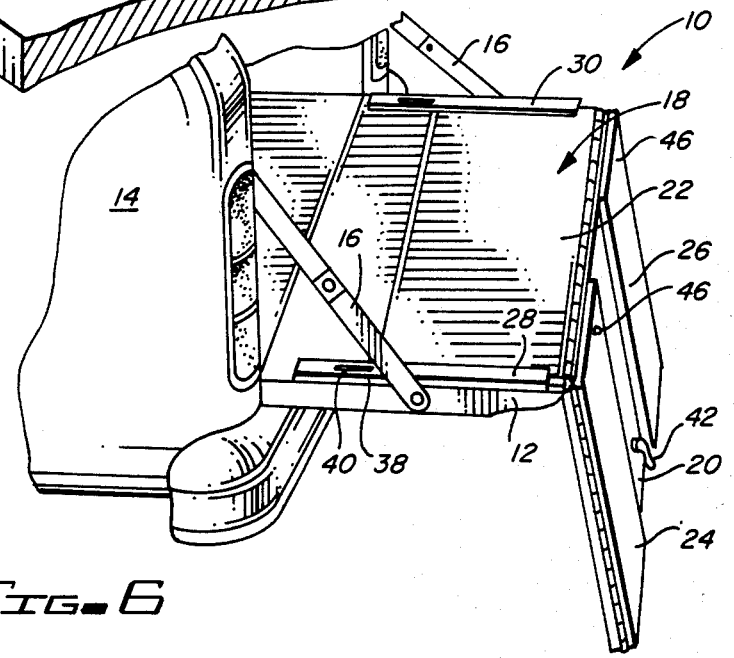
FIG. 6 is a schematic perspective view of the assembly of FIG. 1 in the dumping position.

When it is desired to dump or remove a load hauled by vehicle 14, side panels 24 and 26 are disconnected from sidewalls 48 and 50, and folded to the stored position against panel 20, being releasably held thereon by catches 46 whereupon rear panel 20 can be swung to the down vertical position shown in FIGS. 4 and 6, being totally out of way, if desired, or acting as a loading and unloading ramp.

When it is desired to store container 18, bed panel 22 is slid forward after releasing bullets 38. Side panels 24 and 26 are then folded and secured to panel 20, if not already so, then panel 20 is rotated until it is stacked above bed panel 22 with panels 24 and 26 disposed therebetween. Lock 42 is turned to engage a recess (not shown) in the inner surface of tailgate 12 to lock container 18 thereto in the stored position, and tailgate 12 can be raised to the closed vertical position shown in FIG. 8, occupying only an inch or two of space. If, instead, container 18 is to be removed from tailgate 12, bullets 38 are released and bed panel 22 is slid rearwardly out of guides 28 and 30, whereupon the folded or unfolded container 18 can be stored away from vehicle 14.

Container 18 and guides 28 and 30 can be fabricated inexpensively of durable metal, plastic, wood, etc., in a variety of sizes and shapes to fit vehicle tailgates of various dimensions. Assembly 10 thus is inexpensive, durable and efficient.

FIG. 10

A second preferred embodiment of the improved assembly of the present invention is schematically depicted in FIG. 10. Thus, assembly 10a is shown. Components thereof similar to those of assembly 10 bear the same numerals, but are succeeded by the letter "a". Assembly 10a is substantially identical to assembly 10 except that bed panel 22a and side panels 24a and 26a thereof telescope to extend container 18 rearwardly of tailgate 12a of vehicle 14a and braces 16a for increased hauling space. Panel 20a is identical to panel 20 and slide guides 28a and 30a are identical to guides 28 and 30.

FIG. 11

A third preferred embodiment of the improved assembly of the present invention is schematically depicted in FIG. 12. Thus, assembly 10b is shown. Components thereof similar to those of assembly 10 bear the same numerals but are succeeded by the letter "b".

Assembly 10b comprises container 18b mounted on slide guides 28b and 30b on tailgate 12b of vehicle 14b. Tailgate 12b is supported by brace 16b. Container 18b includes rear panel 20b, bed panel 22b and side panels 24b and 26b.

Assembly 10b differs from assembly 10 only in that slide guides 28b and 30b telescope to extend container 18b rearwardly of tailgate 12b for increased hauling space.

Various other changes, modifications, alterations and additions can be made in the improved assembly of the present invention, its components and their parameters. All such changes, modifications, alterations and additions as are within the scope of the appended claims form part of the present invention.

What is claimed is:

1. An improved vehicle tailgate extension assembly, said assembly comprising, in combination:
   (a) a container having in the hauling mode an open front and top, and closed sides, rear and bottom, said container comprising plurality of generally flat interconnected panels, including:
      i. a bottom bed panel,
      ii. a rear panel hinged to the rear end of said bed panel and moveable between a position overlying said bed panel, a vertical hauling position above said bed panel and a position hanging below and behind said bed panel, and
      iii. a pair of side panels hinged to opposite sides of said rear panel and moveable between a folded position abutting said rear panel and an operative position at about a right angle to said rear panel and extending forwardly thereof; and,
   (b) a pair of slide guides releasably secureable to opposite sides of the tailgate of a vehicle, said guides each having a recess within which a side of said bed panel slides and is releasably secured.

2. The improved assembly of claim 1 wherein said guides include releasable stop means to facilitate securing said bed panel in an operative rear position.

3. The improved assembly of claim 2 wherein said side panels include means for releasably locking said side panels against said rear panel and against the frame of a vehicle.

4. The improved assembly of claim 3 wherein said real panel includes means for releasably locking said assembly in the folded stored position against the tailgate of a vehicle.

5. The improved assembly of claim 4 wherein said side panel releasable locking means and said slide guide releasable stop means comprise spring-type bullet catches.

6. The improved assembly of claim 5 wherein said container is removable from said slide guides by releasing said slide guide stop means and sliding said bed panel from said slide guides.

7. The improved assembly of claim 1 wherein said slide guides telescope to extend said container rearwardly of the tailgate of a vehicle.

8. The improved assembly of claim 1 wherein said bed panel and side panels telescope to extend said container rearwardly of the tailgate of a vehicle.

9. The improved assembly of claim 1 wherein said rear panel includes light reflective safety means and wherein said panels catches, locks and slides are of metal.

10. An improved vehicle extension assembly comprising, in combination:

(a) a vehicle having a predefined storage space, and
(b) means for increasing said storage space,
(c) wherein said vehicle is a flat bed vehicle,
(d) wherein said means for increasing the storage space includes a collapsable container adapted to be secured to the rear end of said vehicle,
(e) wherein said container includes a plurality of interconnecting panels, including:
   i. a bottom bed panel,
   ii. a rear panel hinged to said bed panel, and
   iii. a plurality of side panels hinged to said rear panel, and
(f) wherein said vehicle has a tailgate and said bed panel is slideably connected to said tailgate.

11. The extension assembly of claim 10 wherein said side panels are telescoping panels.

12. The extension assembly of claim 11 wherein said bed panel is a telescoping panel.

* * * * *